United States Patent [19]

Lillquist

[11] Patent Number: 4,687,344
[45] Date of Patent: Aug. 18, 1987

[54] IMAGING PYROMETER

[75] Inventor: Robert D. Lillquist, Schenectady, N.Y.

[73] Assignee: General Electric Company, Schenectady, N.Y.

[21] Appl. No.: 826,391

[22] Filed: Feb. 5, 1986

[51] Int. Cl.$^4$ ............................ G01J 5/02; H01H 5/33
[52] U.S. Cl. .................................... 374/124; 250/332; 358/113
[58] Field of Search ........................ 358/113; 374/124; 340/722; 250/363.28, 332

[56] References Cited

U.S. PATENT DOCUMENTS

| 3,571,504 | 3/1971 | Kiuchi et al. | 358/113 |
| 3,652,784 | 3/1972 | Wupper et al. | 358/113 X |
| 3,659,043 | 7/1970 | Low et al. | 374/124 X |
| 3,715,497 | 2/1973 | Cooper et al. | 358/113 |
| 3,718,757 | 2/1973 | Gulitz et al. | 358/113 |
| 4,302,755 | 11/1981 | Pisani et al. | 340/722 X |
| 4,328,516 | 5/1982 | Colpack et al. | 358/113 |
| 4,471,378 | 9/1984 | Ng | 358/113 X |
| 4,524,386 | 6/1985 | Scott | 358/113 |
| 4,539,588 | 9/1985 | Ariessohn et al. | 358/113 |
| 4,590,511 | 5/1986 | Bocchi et al. | 358/82 |

Primary Examiner—Daniel M. Yasich
Attorney, Agent, or Firm—Donald R. Campbell; James C. Davis, Jr.; Paul R. Webb, II

[57] ABSTRACT

An imaging radiometer for high temperature measurements has a sensor head comprised of a solid-state video camera operated in fixed gain mode, preferably one with a charge injection device detector, an infrared filter, and a lens system to image a radiating object on the detector array. Spectral response of the system is limited to 700 to 1100 nanometers or a smaller portion of this near-infrared band. The video signal output of the sensor is processed and object temperature is displayed on a television monitor; alternatively the video signal is presented to a digital frame grabber and converted to a temperature map.

6 Claims, 3 Drawing Figures

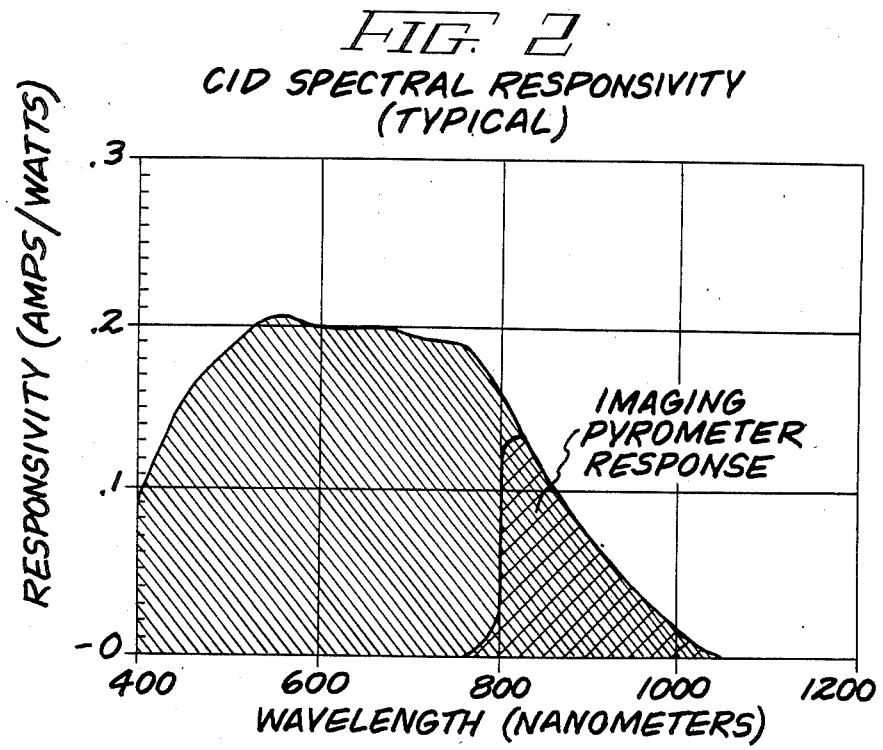
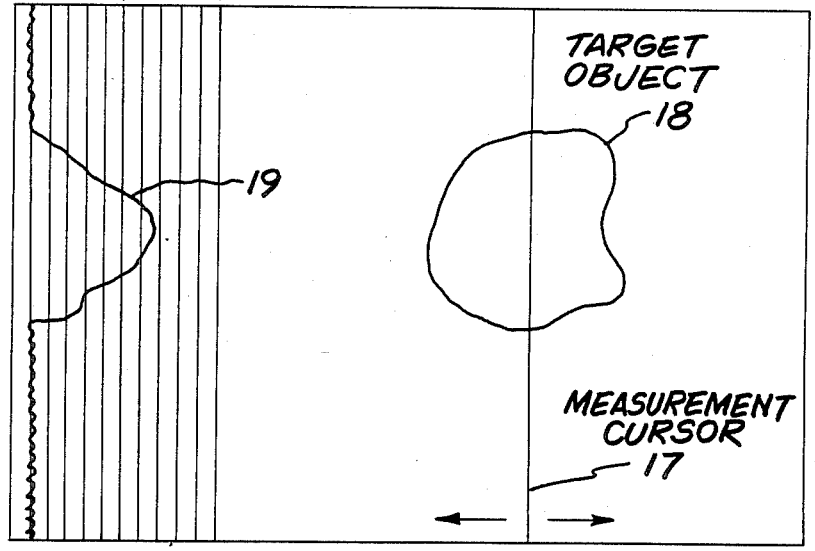

IMAGING PYROMETER

BACKGROUND OF THE INVENTION

This invention relates to a system for measuring the surface temperature distribution of remote objects above approximately 400° C., such as metals during processing.

Numerous material joining, melting and heat treating processes depend upon precise temperature control for success. Most often, contact temperature sensors such as thermocouples are used when possible, but such sensors only reveal the temperature at discrete locations. Rapidly moving or otherwise inaccessible parts cannot, in general, be instrumented in this manner. Contact sensors may also introduce unacceptable impurities in materials. Radiation pyrometers, such as the present invention, often provide the most practical solution to these measurement problems Conventional "spot" radiation pyrometers provide an effective and accurate means to remotely measure the surface temperature of small areas and are intended to replace contact sensors where the use of the latter is impractical. These instruments have been commercially available from a number of vendors for decades. Spot pyrometers will yield local temperature measurements of a remote surface and will not reveal variation of temperature over the surface unless the device is scanned over the surface or several pyrometers are used.

Since the early 1970's, a few vendors have offered imaging infrared radiometers (also known as Forward Looking InfraRed scanners or FLIR's) which generate a television-like display of object radiance, i.e. object temperature. These devices typically use cryogenically-cooled, single-element photoconductive or photovoltaic detectors and mechanically-scanned optical axes and operate in the 2-6 and 7-14 micrometer spectral region. Neither spectral band is optimal for accurate temperature measurements of most metals at typical processing conditions since metal emissivity is generally quite low at these wavelengths in comparison to the near-infrared (0.7-2 micrometers). Furthermore, the cooling systems and delicate scanning mechanisms required by most thermal infrared imagers often preclude their use in harsh industrial environments.

The present invention fills the gap in available instrumentation between spot radiation pyrometers and thermal infrared imaging radiometers for high temperature measurement and process control industrial applications.

SUMMARY OF THE INVENTION

An object of the invention is to combine the thermal mapping and display capabilities associated with thermal infrared imaging radiometers with the accuracy, reliability and low relative cost of spot radiation pyrometers.

Another object is to provide such an instrument to supplement or replace contact temperature sensors and other radiation pyrometers for industrial temperature measurement, particularly to monitor and control metal melting, heat treating and joining processes.

The imaging radiation pyrometer system is constructed from an electronic or solid-state video camera having a two-dimensional detector array which responds to radiation wavelengths in the near-infrared range, and operates in a fixed gain mode so to have a linear response of video output signal to incident radiation intensity. A lens or lens system with a known aperture forms an image of the remote object on the detector focal plane. Means are provided to limit the spectral response of the system to suppress erroneous measurements due to extraneous light; an infrared filter is typically mounted in the camera directly in front of the detector array The system further includes means for quantitatively determining from the video signal the temperature at any point on the object surface within the sensor's field of view, and for displaying object temperature. The instrument measures surface temperatures above approximately 400° C.; neutral density filters are added to extend the high temperature range.

A preferred embodiment uses a charge injection device (CID) solid-state video camera and internally mounted infrared filter, and a standard television camera lens with one or more reproducible aperture settings. Spectral response of the instrument is restricted to 700 to 1100 nanometers or any smaller portion of this band. The video signal output from the sensor head is processed by a video analyzer prior to display on a black and white television monitor and provides a continuous graphical display of temperature variations along a user-positioned measurement cursor. A second display option is to present the video signal to a color synthesizer and show each temperature band as a distinct color or hue on a color monitor. A third alternative is a digital frame grabber to convert the video output to digital form and signal intensity to a temperature map.

BRIEF DESCRIPTION OF THE DRAWINGS

FIG. 2 illustrates the typical spectral responsivity of an imaging radiation pyrometer with a CID detector.

FIG. 3 shows the display layout in a system having a video analyzer and black and white television monitor; the trace gives temperature variations along a user positioned measurement cursor.

DETAILED DESCRIPTION OF THE INVENTION

Figure 1:
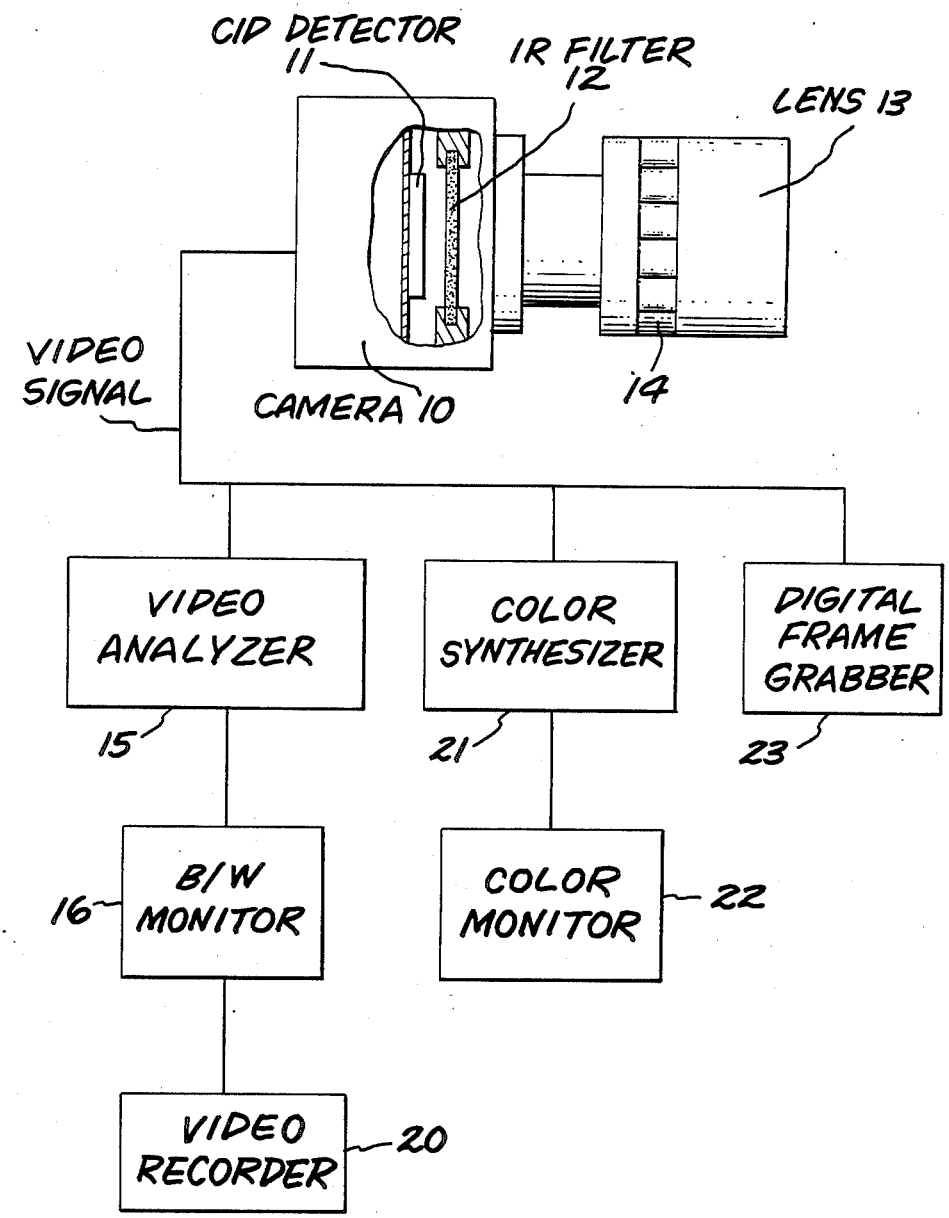
FIG. 1 shows the imaging pyrometer system with various display options.

Referring to FIG. 1, the imaging pyrometer may be constructed from any television or video camera using a detector which responds to radiation wavelengths in the near-infrared, approximately 0.7 to 2.0 micrometers or any portion thereof, and is capable of operating in a fixed gain mode, i.e. the video signal output by the camera is proportional to the radiant power flux incident upon the detector. The preferred embodiment is a solid-state video camera 10 having a charge injection device two-dimensional silicon detector array 11, such as the General Electric TN-250X series (2500, 2505, 2509 and variants) CID Solid-State Camera. All GE cameras in this series may be operated in the required fixed-gain mode either by default or jumper configuration. They are preferred for their superior stability, low fixed-pattern noise and infrared anti-blooming characteristics in comparison to other devices generally available. Cameras based on alternative detector array architectures, including but not limited to charge coupled device (CCD), diode matrix or vacuum tube Vidicon-like devices, such as the Texas Instruments "Tivicon" tube could also serve as the basis for this pyrometer.

An infrared filter 12, more particularly a long pass type, is placed in such a manner as to limit the camera's spectral response to the convolution of the filter's transmission and the responsivity limits of the detector array 11. A filter with an abrupt "cut on" wavelength of between 700 and 900 nanometers is preferred. This filter serves to eliminate most of the extraneous radiation from sources other than the intended target without significantly reducing the sensitivity of the pyrometer. Its use is optional, but highly recom-mended. The infrared filter 12 is in the optical path between a lens system 13 and the detector; the illustrated filter is internally mounted in the camera and is placed in a holder positioned immediately in front of the sensing surface of detector array 11. A working prototype of the instrument was constructed with a Hoya IR-80N infrared long-pass filter. Typical detector and filter limits as utilized in the preferred embodiment are shown in FIG. 2. The spectral responsivity of a charge injection device silicon detector array typically extends from about 400 to 1100 nanometers. Above this upper limit silicon becomes increasingly transparent to infrared radiation. Light wavelengths shorter than approximately 800 nanometers are blocked by the filter 12. The spectral response of the system is intentionally limited to about 700 to 1100 nanometers or a smaller portion of this band in order to suppress erroneous measurements due to room lighting and the like sources.

Lens system 13 has one or more fixed, known apertures and forms an image of the radiating object on the detector focal plane. Virtually any standard television camera lens with precision, reproducible aperture settings can be employed in this system. A good general choice is a 10 millimeter focal length, f/1.4 telephoto "C" mount lens with "click adjustable" aperture settings which are changed by rotating ring 14. An instrument in the factory that repetitively performs a given measurement task may have only one preset, known aperture, whereas a laboratory instrument should have several aperture settings to fit it for a variety of tasks.

The three components of the sensor head that have been described are the solid-state video camera 10, infrared filter 12, and lens system 13 (a single lens is adequate for some systems). The imaging pyrometer with such a sensor measures the surface temperature distribution of remote obects above approximately 400° Celsius Neutral density filters are added to extend the high temperature range of the instrument. One good location is to place them in front of the infrare filter 12. At the lower end of the temperature range the f/1.4 lens aperture is used, and to measure higher temperatures a smaller aperture is selected.

The video signal output from camera 10 can be directly displayed on a television monitor resulting in a continuous grey scale depiction of temperature variations of the target object. The basic signal is most often processed further to yield more informative displays. The video output signal of the GE CID Solid-State amera is a standard EIA RS-170 composite signal (525 line, 60 Hz, 2/1 interlace). The camera could, of course, be built to output a European standard signal. In a preferred embodiment of one display option, the video signal from the sensor is processed by a video analyzer 15 prior to display on a black and white, television monitor 16. A Colorado Video (Boulder, CO) Model 321 Video Analyzer, for instance, provides a continuous graphical display of signal intensity, i.e. object temperaure, along a user-selected cursor as well as additional signal outputs useful for further processing. A sketch of the imaging pyrometer's display, as modified by the foregoing Video Analyzer, is seen in FIG. 3 where the black and white display layout is illustrated. A user positioned measurement cursor 17 is adjustable left and right, passing through or intersecting the target object 18. Trace 19 at the left on the display grid gives the temperature variations along the measurement cursor line.

More elaborate video signal processors are readily added to the system. As shown in FIG. 1, a video recorder 20 is fed the object temperature signals from television monitor 16. A second display option is to have a color synthesizer 21 and color monitor 22. Each temperature band then has a distinct color or hue. If a step display is desired, the temperature bands have different colors; in a continuous display the bands are various hues of the same color. A third display option, expecially suitable if the instrument is tied into a control system, is to have a digital frame grabber 23. The video signal, frame by frame, is converted into digital form and a look-up table converts the digitized signal intensity into a temperature map.

The most basic calibration of the imaging pyrometer system entails obtaining the relationship between video signal voltage and blackbody absolute temperature for each aperture and filter combination used for any given lens and camera (detector plus infrared filter). This procedure is most readily accomplished utilizing a laboratory blackbody radiation source, such as the Infrared Indutries Model 464 Blackbody, while making use of the video analyzer D.C video signal. The calibration curve is well described by the relation $$V = \frac{A}{\exp(B/T) - 1} + C$$

where
V = Video Signal Voltage,
T = Blckbody Absolute Temperature [Kelvin]and
A,B,C = calibration constants.

The pyrometer may be focused by illuminating the target with a bright floodlamp. This lamp must be turned off when temprature measurements are taken. Although the infrared filter provides some protection against errors due to erroneous background radiation, the operator must insure that the target area is shielded from any bright sources of external radiation prior to use. It is seen that a properly calibrated imaging pyrometer system quantitatively determines from the video signal the object temperature at any point in the field of view of the sensor over the sensitivity range of the system.

Among the many applications of the imaging pyrometer are monitoring and controlling metal heat treating, melting and joining processes used to manufacture precision components. This instrument is intended to supplement or replace contact temperature sensors and other radiation pyrometers for industrial temperature measurements.

While the invention has been particularly shown and described with reference to preferred embodiments thereof, it will be understood by those skilled in the art that various changes in form and details may be made without departing from the spirit and scope of the invention.

The invention claimed is:

1. An imaging pyrometer to measure the surface temperature of remote objects above about 400° C. comprising:
    a sensor head comprised of:
    (a) a solid-state video camera having a two-dimensional charge injection device silicon detector which responds to radiation wavelengths in the hear-infrared up to approximately 1100 nanometers and is operated in a fixed gain mode to have a video signal output proportional to incident radiant power flux,
    (b) a lens system with or more known, reproducible aperture settings to image said object on a focal plane of the detector;
    (c) an infrared filter in the optical path in the sensor head betwee said lens system and detector having a cut on wavelength beteen 700 and 900 nanometers to eliminate extraneous light; and
    means for quantitatively determining from said video signa and displaying the temperature at any point on the surface of said object within the field of view of said sensor. with the display being along variable positioned cursor lines.

2. The imaging pyrometer of claim 1 wherein said last-mentioned means includes a video analyzer to process said video signal and a television monitor to provide a continuous graphical display of temperature variations along said cursor lines.

3. The imaging pyrometer of claim 2 further comprising a video recorded.

4. The imaging pyrometer of claim 1 wherein said last-mentioned means include a color synthesizer and television monitor to display each temperature band as a distinct color or hue.

5. The imaging pyrometer of claim 1 wherein said last-mentioned means includes a digital frame grabber to convert said video signal into digital form and a look-up table which converts digitized signal intensity into a temperature map.

6. An imaging pyrometer system to measure the surface temperature distribution of a remote object above 400° C. comprising:
    a solid-state video camera having a two-dimensional charge injection device silicon detector which responds to radiation wavelengths in the near-infrared range of about 700 to 1100 nanometers and has a fixed gain and a video signal output that is proportional to the radiant power flux incident upon said detector;
    a lens system, whose aperture is known and reproducible to form an image of said object on a focal plane of the detector;
    means comprised of an infrared filter positioned in front of said detector in the camera to limit the spectral response of said system to about 700 to 1100 nanometers of any portion thereof; and
    means for processing said video signal and for displaying object temperature on a television monitor, said processing means being a video analyzer to provide a graphical display of temperature along a measurement cursor line.

* * * * *

UNITED STATES PATENT AND TRADEMARK OFFICE
CERTIFICATE OF CORRECTION

PATENT NO. : 4,687,344
DATED : August 18, 1987
INVENTOR(S) : Robert David Lillquist It is certified that error appears in the above-identified patent and that said Letters Patent is hereby corrected as shown below:

Column 3, line 34, "10 millimeter" should be - 50 millimeter -; line 46, there should be a period after "Celsius"; line 49, - infrared - is misspelled; line 64, the comma after "white" should be deleted; lines 67 and 68, - temperature - is misspelled.

Column 4, line 32, - Industries - is misspelled; line 41, - Blackbody - is misspelled; line 45, - temperature - is misspelled.

Claim 1, line 8, "hear-infrared" should read - near-infrared -; line 11, the comma should be a semicolon; line 12, after "with" insert - one -; lines 16 and 17, - between - is misspelled; line 20, - signal - is misspelled; line 22, the period after "sensor" should be deleted;

Claim 3, line 2 of the claim, "recorded" should read - recorder -.

Claim 6, lines 11 and 12 of the claim, a comma should appear after "reproducible".

Signed and Sealed this

Twenty-sixth Day of April, 1988

*Attest:*

DONALD J. QUIGG

*Attesting Officer*   Commissioner of Patents and Trademarks